(No Model.)
D. R. PROCTOR.
SAW.
No. 347,008. Patented Aug. 10, 1886.
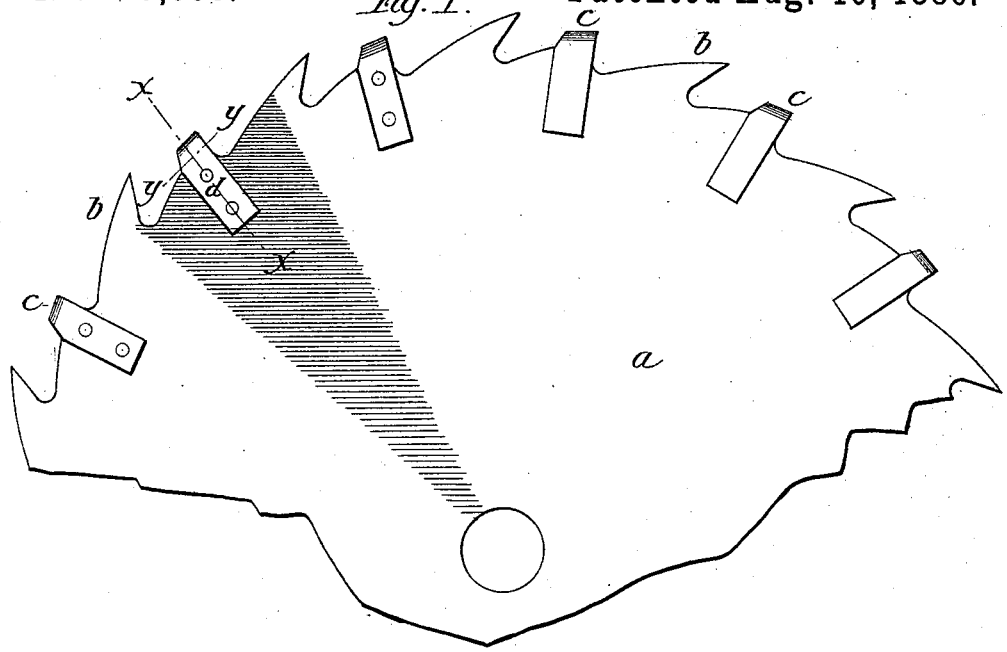
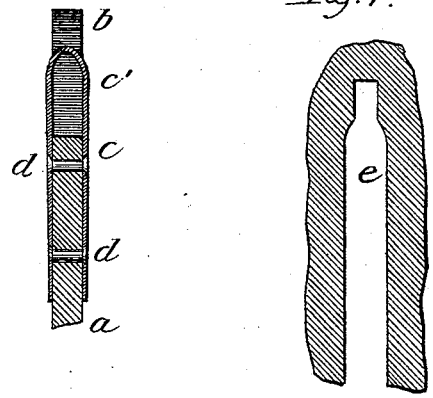
Witnesses:
Albert H. Adams,
Frank J. Blanchard.
Inventor:
David R. Proctor

UNITED STATES PATENT OFFICE.

DAVID R. PROCTOR, OF CHICAGO, ILLINOIS, ASSIGNOR TO THE LUMBER SAVING AND DRESSING SAW COMPANY, OF SAME PLACE.

SAW.

SPECIFICATION forming part of Letters Patent No. 347,008, dated August 10, 1886.

Application filed February 10, 1886. Serial No. 191,459. (No model.)

*To all whom it may concern:*

Be it known that I, DAVID R. PROCTOR, residing at Chicago, in the county of Cook and State of Illinois, and a citizen of the United States, have invented a new and useful Improvement in Circular Saws, of which the following is a full description, reference being had to the accompanying drawings, in which—

Figure 1 is a side view, partly broken away; Fig. 2, a cross-section on line $x\,x$ of Fig. 1, enlarged; Fig. 3, a cross-section on line $y\,y$ of Fig. 1; Fig. 4, a section of wood, showing the saw-kerf.

The object of this invention is to provide a circular saw with smoothing bits or blades which will smooth or plane the sides of a saw-kerf while it is being formed by the saw, so as to produce lumber sufficiently planed for most purposes without further or additional planing after a log has been reduced to boards; and its nature consists in providing the saw with cutting or smoothing blades alternating or partly alternating with the teeth, as hereinafter described and claimed as new.

In the drawings, $a$ indicates the saw-blade; $b$, saw-teeth; $c$, cutters; $d$, rivets; $e$, saw-kerf.

The saw-blade is made in the ordinary manner, and the teeth $b$ are chiseled or square-pointed and are not set, but are left in the plane of the saw-blade as formed. The blades $c$ are made tapering downwardly and rearwardly, as shown in Figs. 2 and 3, in order to prevent friction and undue heating in operation, the cutters being the widest at the points $c'$. At this point and at their upper ends they are sharpened from the inside, so as to give them a sharp cutting-edge. These cutting-edges are best formed before the cutters are folded or bent, so that they will require but little sharpening when put into proper shape for applying them to the saw. They are also formed so that at their outward extremities they will recede slightly, which aids in keeping them sharp. This receding may be formed in the cutters so that they may be applied radially, or they may be squarely turned and the incline produced by applying them so that the edge lines "produced" will pass forward of the center, instead of applying them radially. When bent in the arch form shown in Fig. 2, this receding is not essential to their operation, and is mainly beneficial in aiding to keep them sharp.

The teeth $b$ project beyond the cutters, so that in operation the saw produces a kerf similar in outline to that shown at $e$ in Fig. 4. By this arrangement the cutters clear a passage for the teeth, so that the necessity for setting them is avoided, and the cutters form a sufficient kerf to enable the saw to run freely, the cutters making the space ordinarily made by the set of the teeth. The cutters also steady the teeth and the saw, so that it runs smoothly, without jarring or trembling, and they also prevent the scratching of the lumber by what is known as the "backlash" of the saw. At the same time the cutters smooth the board by taking off thin, light shearings, which pass through them, and which are thrown out of the kerf by the action of the teeth with the sawdust, so that there is no clogging of the saw by the use of these cutters.

The cutters are applied by rivets $d$ or by other suitable means, and, if desired, they may be made to be set in the body of the saw-blade, as teeth are frequently inserted in circular saws, thus producing from the mill smooth planed boards which do not require further planing for ordinary uses.

I have shown and described my improvement as applied to a circular saw, where it will be found most beneficial; but these cutters may be applied to straight saws, whether used singly or in gangs, with good results. I have also shown the cutters as applied alternately with the teeth; but the cutters will subserve a useful purpose and produce good results when a less number are applied than the number of teeth on the saw.

I am aware that it has been heretofore proposed to combine planing devices with circular saws; but they have not been so applied as to completely detach the shavings or dust and permit them or it to pass through the cutter into teeth-spaces, to be thrown out by the teeth without clogging or choking the air-space at the sides of the saw; nor have the cutting-teeth been made to have their edges continued or come together within the teeth space or kerf, so that the teeth form an advance guide-opening for the cutters, which act in exact opposition to each other on both sides of the kerf, with the outer ends of the cutters directly opposite each other and connected together so that each half of each cutter steadies its opposite half, and in these respects my improvements are important. My improvements further differ in their operation, as the teeth not being set or swaged out and sawing in advance the teeth hold the cutter steady, thus producing a steadiness of the saw which has not heretofore been obtained, and the advantage of using a saw without set is, that saw-blades are not sprung or strained from the original truing.

What I claim as new, and desire to secure by Letters Patent, is—

1. The combination, with a saw-blade, of a cutter, $c$, consisting of a strip of metal doubled together and embracing the blade, and having a convex cutting-point sharpened at each side to form two cutting-edges, $c'$, which are directly opposite each other and project beyond the body of the blade, the points of the saw-teeth extending outward beyond said convex cutting-edge, substantially as described.

2. The combination, with a saw-blade, $a$, having chiseled or square-pointed teeth $b$ formed in the same plane as the blade, of a cutter, $c$, secured to the blade and having a convex cutting-point formed with two cutting-edges, $c'\ c'$, arranged directly opposite each other and extending beyond the body of the blade and terminating between the edge of said body and the points of the saw-teeth, substantially as described.

3. The combination, with the saw-blade $a$, having chiseled or square-pointed teeth $b$ formed in the plane of the blade, of the cutters $c$, secured to the blade between pairs of the teeth and having cutting-points $c'$ at their outer ends, which extend laterally from each side beyond the plane of the teeth, and are connected together and directly opposite each other, said teeth projecting outward beyond the cutting-points of the cutters to form an advance guide-opening for said cutters, substantially as described.

DAVID R. PROCTOR.

Witnesses:
ALBERT H. ADAMS,
EDGAR T. BOND.